May 6, 1958

R. E. BARIEAU 2,833,929

METHOD OF DETERMINING CHARACTERISTICS OF
HYDROGEN-CONTAINING SUBSTANCES

Filed July 23, 1953

INVENTOR
ROBERT E. BARIEAU
BY
ATTORNEYS

United States Patent Office

2,833,929
Patented May 6, 1958

2,833,929

METHOD OF DETERMINING CHARACTERISTICS OF HYDROGEN-CONTAINING SUBSTANCES

Robert E. Barieau, Berkeley, Calif., assignor to California Research Corporation, San Francisco, Calif., a corporation of Delaware Application July 23, 1953, Serial No. 369,858

6 Claims. (Cl. 250—43.5)

This invention relates in general to methods and apparatus for determining a characteristic of a hydrogen-containing substance and in particular to methods and apparatus for determining such a characteristic using penetrative radiation.

It is often difficult to determine a characteristic or characteristics of a liquid or gas in a closed receptacle or in a conduit through which the substance is flowing without withdrawing a portion of the substance for analysis. Similarly, it is difficult to determine certain characteristics, such as hydrogen content, of a sample of a solid such as a well bore core without destroying or disfiguring the sample.

It has been proposed to utilize penetrative radiation to determine the proportion of two substances in a mixture by measuring the intensity of radiation transmitted from a given radiation source through a given thickness of each of the component substances individually, and then by calculations involving the mass absorption coefficients of the individual substances, determining the proportions of the two substances in the mixture by measuring the radiation transmitted through the mixture and comparing this measurement with the individual measured intensities. This method has the disadvantage that it is only operable for a mixture having a maximum of two components and that the calculations must be made for each different mixture tested. This method has the further disadvantage that it gives no information concerning the proportion of any element in a mixture of compounds. Thus, this method is very time consuming and has limited application.

In accordance with the present invention, a method has been devised through the use of which the determination of certain characteristics of hydrogen-containing substances may be continuously determined without access to the receptacle or conduit in which such substances are contained and without destruction or deformation of the substances. The determination of such characteristics is substantially independent of the composition of the hydrogen-containing substance, and for a given radiation source, the method and apparatus of this invention can be utilized for testing a great variety of hydrogen-containing substances without additional calibration. In carrying out the invention, a beam of penetrative radiation is transmitted through the hydrogen-containing substance to be analyzed and a measurement made of the intensity of the beam after transmission through the substance. By correlating this intensity with the intensity of the beam after being transmitted through hydrogen-containing substances whose characteristics are known, the desired characteristics of the tested substance can be determined.

It is therefore an object of this invention to provide an improved method and apparatus for determining a characteristic of a hydrogen-containing substance utilizing penetrative radiation.

It is an additional object of this invention to provide a method and apparatus for determining selected characteristics of hydrogen-containing substances, which method and apparatus is substantially independent of the composition of such hydrogen-containing substances.

It is an additional object of this invention to provide a method for determining the hydrogen content of a hydrogen-containing substance utilizing penetrative radiation.

It is a further object of this invention to provide a method for determining the density of a hydrogen-containing substance utilizing penetrative radiation.

It is an additional object of this invention to provide an improved method for analyzing a hydrogen-containing substance by means of gamma rays to determine a characteristic of the substance.

Objects and advantages other than those set forth above will be readily apparent from the following description when read in connection with the accompanying drawing, in which.

Figure 1:
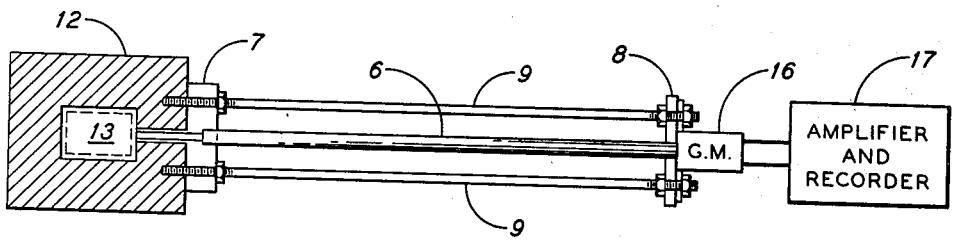
Fig. 1 illustrates one embodiment of apparatus adapted to carry out the method of this invention.

Fig. 1 illustrates apparatus suitable for determining selected characteristics of a hydrogen-containing substance on a batch basis. The substance to be analyzed may be placed in a tube 6 of suitable material such as glass. Tube 6 is adapted to slide through openings in a collimating ring 7 and a guide ring 8 which serve to align tube 6. Ring 8 is secured to ring 7 by braces 9 extending therebetween. Collimating ring 7 is mounted on, and extends into, an opening in suitable shielding means such as a lead shield 12 containing a source 13 of gamma rays or X-rays. In the claims and specification of this application, the term gamma ray is used interchangeably with the term X-ray, since, for the purposes of the method of this invention, both of these types of radiation are equivalent. The thickness of shield 12 is such that substantially all of the gamma rays emitted by source 13 are absorbed by the shield except for a collimated beam emitted through the opening in collimating ring 7 into which tube 6 extends.

Thus, this collimated beam of gamma rays is transmitted into the substance in tube 6 and the intensity of the beam of gamma rays which traverse the length of tube 6 is measured by suitable detector means such as a Geiger-Mueller counter 16. Counter 16 may be connected to suitable amplifying and/or integrating means 17 to provide an indication of the radiation intensity transmitted through the length of the substance in tube 6.

While electrons lose energy principally by ionization, gamma rays interact with matter in three major ways. In the first process, the photoelectric effect, the gamma photon is completely absorbed by an atom, and an orbital electron is ejected with the original energy of the photon minus the binding energy of the electron. This process has a low probability for high energy photons and atoms of low atomic number. In the second process, pair production, the photon is completely absorbed in the atom with the creation of an electron-positron pair. This process has a threshold at one million electron volts but is quite unimportant for the lighter elements at energies less than ten million electron volts. In the third process, Compton scattering, the photon is inelastically scattered by collision with an electron in the atom, and the scattered photon has diminished energy and momentum. The probability of this scattering process is proportional to the number of atomic electrons and decreases with increasing photon energy.

In the absorption of the higher energy gamma rays from radioisotopes by hydrocarbons and their common light element impurities, such as sulfur, nitrogen, and oxygen, the photoelectric and pair production processes are not involved, and the absorption of gamma rays is accomplished primarily by Compton scattering. This is true for gamma ray energies from about 0.5 million electron volt to the upper limit obtainable from radioisotopes, about 3 million electron volts. It follows, therefore, that in passing through a given thickness of a substance, the attenuation of gamma rays from a source having an energy level of between 0.5 m. e. v. and 3 m. e. v. will be a function of the number of electrons per unit mass, or the electron density, of the substance.

The electron density of an element is given by the ratio $Z/A$, where $Z$ is the atomic number of the element and $A$ is the atomic weight of the element. The electron densities of a number of the lighter elements are as follows: helium 2/4.002, carbon 6/12.010, nitrogen 7/14.008, oxygen 8/16.000, and sulfur 16/32.066. Thus, since the ratio of $Z/A$, or electron density, of these lighter elements is substantially 1/2, a given thickness of each of such elements will absorb or attenuate to substantially the same degree gamma rays from a source having the above critical limits. However, the electron density of hydrogen is 1/1.008, or substantially 1/1, so that the absorption of gamma rays by hydrogen is markedly different from the gamma ray absorption of the lighter elements discussed above, and it is this unique absorption characteristic of hydrogen which is utilized in this invention to determine selected characteristics of a hydrogen-containing substance.

As stated above, assuming the simplest theoretical considerations, the absorption by a material of gamma rays from a source having an energy level between the above limits is a function of the number of electrons per unit area of material. For a pure hydrocarbon material, the number of electrons per unit area is directly proportional to the expression:

$$\text{milligrams/centimeter}^2 \left( \text{weight percent carbon} \times \frac{Zc}{Ac} + \text{weight percent hydrogen} \times \frac{Zh}{Ah} \right)$$

where

Milligrams/centimeter$^2$=the mass per unit area of the hydrocarbon
Weight percent carbon=the percentage by weight of carbon in the hydrocarbon, expressed as a percentage of unity
$Zc$=the atomic number of carbon
$Ac$=the atomic weight of carbon
Weight percent hydrogen=the percentage by weight of hydrogen in the hydrocarbon, expressed as a percentage of unit
$Zh$=the atomic number of hydrogen
$Ah$=the atomic weight of hydrogen The mass per unit area is directly proportional to the density of the hydrocarbon for a sample of fixed thickness. The mass per unit area is also directly proportional to the weight of the hydrocarbon for a sample of fixed cross-sectional area. Therefore, the expression mg./cf.$^2$ can be converted to either density $d$, or weight $w$, depending upon which of the two latter parameters are to be used.

Since $Zc/Ac=1/2$; $Zh/Ah=1$; and weight percent carbon=1-weight percent hydrogen, the above expression reduces to:

$$\frac{d(1+H)}{2}$$

where $H$ is the weight percent hydrogen.

If it is desired to use weight $w$, the expression can be converted to:

$$\frac{w(1+H)}{2}$$

Thus, the absorption by a hydrocarbon of gamma rays from a source having a critical energy is a function of the quantities $$\frac{d(1+H)}{2}$$

and $$\frac{w(1+H)}{2}$$

It will be noted in the derivation of these quantities that, although a substance containing only carbon and hydrogen was assumed, the presence of other elements in the hydrocarbon will not change the quantities $$\frac{d(1+H)}{2}$$

and $$\frac{w(1+H)}{2}$$

as long as these other elements have ratios of $Z/A$ of substantially 1/2. This is so because the other elements, having ratios of $Z/A$ of substantially 1/2, will attenuate the gamma rays to the same extent that carbon does, so that the effect of the presence of these other elements will for all practical purposes be the same as if the other elements were carbon.

To calibrate the test apparatus for a given sample thickness, source 13 is chosen to emit X-rays or gamma rays having energies between 0.5 m. e. v. and 3 m. e. v. Such a source may comprise an X-ray machine capable of emitting X-rays having the desired energy, or may comprise a suitable radioisotope. The radioisotope selected should have a long half-life and monochromatic radiation in the energy range between 0.5 m. e. v. and 3 m. e. v. One example of such a source is 5.3 year cobalt-60, emitting gamma rays of 1.17 m. e. v. and 1.33 m. e. v. Another example of a suitable radioisotope source is 37-year cesium 137 which decays by beta radiation to 2.6 minute barium 137, which in turn emits gamma rays of 0.67 m. e. v.

Figure 2:
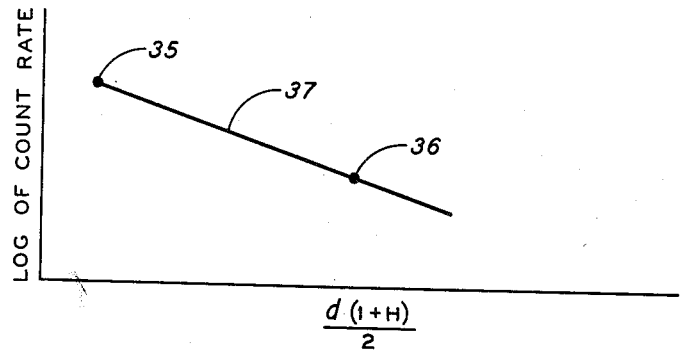
Fig. 2 is a graph illustrating the relationship between the intensity of radiation transmitted through a group of hydrogen-containing substance and certain characteristics of such substances.

Assuming that it is desired to use the quantity $$\frac{d(1+H)}{2}$$

a first hydrogen-containing substance having a known hydrogen content and a density which is either known or can be determined is then inserted in tube 6 and the tube 6 aligned with the opening in collimating ring 7 and the window end of detector tube 16. The numerical value of the quantity $$\frac{d(1+H)}{2}$$

for the known substance is determined, using the known density and hydrogen content. The intensity of the beam of gamma rays transmitted through the first known substance is measured to provide a count rate for the substance. To increase the statistical accuracy, the counting period may be made as long as possible. Also, the accuracy may be increased by increasing the path length through which the gamma rays travel in the tested substance to obtain maximum attenuation, commensurate with the strength of the emitter utilized. The count rate may then be plotted, preferably on a logarithmic scale, against the numerical value obtained from the quantity $$\frac{d(1+H)}{2}$$

for the first substance, to obtain a point, such as point 35, as shown in Fig. 2.

The first substance is then removed from tube 6 and a second known hydrogen-containing substance placed in tube 6 and a measurement of the intensity of the beam of gamma rays transmitted therethrough obtained. The density and hydrogen content of the second substance must be known, and either the density or hydrogen content of the second substance must differ from the corresponding values for the first known substance in order to obtain a different numerical value for the quantity $$\frac{d(1+H)}{2}$$

for the second substance. The count rate for the second substance is plotted against the numerical value of $$\frac{d(1+H)}{2}$$

for the second substance to obtain a point, such as point 36 of Fig. 2.

Additional hydrogen-containing substances of known density and hydrogen content may be similarly analyzed to obtain additional points for plotting a curve. However, I have found that for a great number of hydrogen-containing substances, the points determined by the above-described method fall substantially along a straight line, so that determination of two points of this line will suffice to obtain a sufficiently accurate curve to work with.

For example, samples of a series of compounds comprising isopentane, pentane, isooctane, acetone, cyclohexane, butanol, toluene, benzene, water and thiophene were analyzed by the above-described method and the resulting points fell along a substantially straight line.

Thus, a curve 37 which is substantially a straight line may be drawn through points 35, 36 and extended out a considerable distance. Then the substance to be tested is placed in tube 6, and the intensity of the radiation transmitted through the tested substance is recorded or noted. Using this value of measured intensity, the corresponding numerical value of the quantity $$\frac{d(1+H)}{2}$$

for the tested substance may be read on the axis of abscissa. As will be seen, this quantity is a function of two variables, density and hydrogen content, and the numerical value of the quantity may be made to have significance in itself, or, knowing the value of one of the two above variables, the equation may be solved to determine either the density or hydrogen content of the tested substance.

It will be noted that once the calibration curve 37 is obtained for a given gamma ray source and a given thickness of sample, the curve is valid for analyzing any hydrogen-containing substance, so that the composition of the analyzed substance is independent of the composition of any of the hydrogen-containing substances used in obtaining calibration curve 37. The only limitation is that, when the gamma ray source is above 1 m. e. v., the hydrogen-containing substances should not contain too great an amount of elements whose ratios of $Z/A$ are substantially greater than $1/2$ because the process of pair production in such elements becomes increasingly important, so that the above simplified considerations no longer hold true. If it is known that the substance to be tested contains considerable amounts of the heavier elements, such as those above zinc in the periodic table, a source of gamma rays having an energy below 1.022 m. e. v. could be utilized to eliminate pair production.

Although the above description relates to the analysis of a hydrogen-containing substance using the quantity $$\frac{d(1+H)}{2}$$

it will be readily apparent that the quantity $$\frac{w(1+H)}{2}$$

may also be used. To use the latter quantity, the cross-sectional area of the tested substance through which the radiation is transmitted is maintained constant, rather than maintaining a constant path length as when the quantity $$\frac{d(1+H)}{2}$$

is used.

Figure 3:
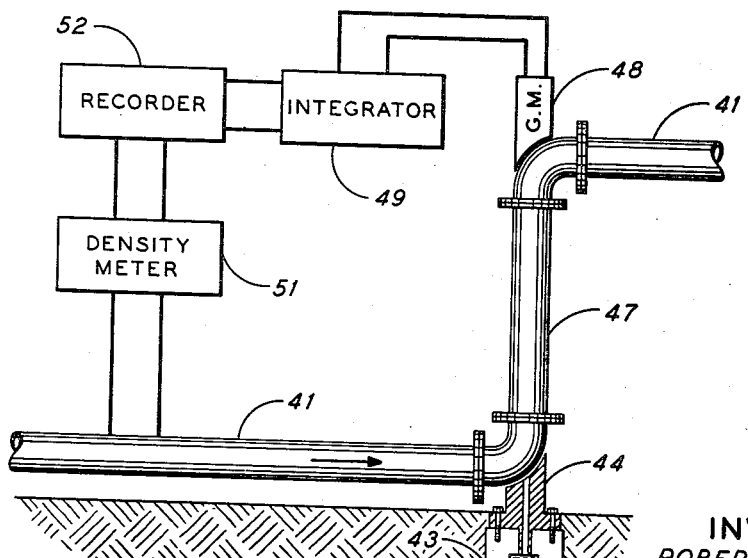
Fig. 3 diagrammatically illustrates an alternate embodiment of this invention applied to the continuous determination of characteristics of a hydrogen-containing substance flowing in a pipeline.

To adapt the method and apparatus of this invention to the continuous determination of a selected characteristic or characteristics of a flowing stream of hydrogen-containing fluid, the apparatus shown diagrammatically in Fig. 3 may be utilized. In Fig. 3, 41 represents a conduit such as a pipeline carrying a hydrogen-containing substance such as a hydrocarbon stream. The source of gamma rays is located in any suitable position relative to conduit 41. From the safety standpoint, the source may comprise an emitter 42 of gamma rays encased in lead shield 43 and placed below the surface of the ground. Emitter 42 is chosen to emit gamma rays having energies of from 0.5 million electron volts to 3 million electron volts, for the reasons set forth above. Shield 43 may be provided with a collimating ring or collar 44 extending up through the ground and positioned closely adjacent to the lower end of a vertical section 47 of pipeline 41. Emitter 42 therefore transmits a collimated beam of gamma rays through the substance in the vertical section 47. A detector, such as a Geiger-Mueller counter 48, is suitably mounted at the top of section 47 to measure the intensity of the radiation transmitted from emitter 42 through the substance in section 47.

Detector 48 is connected to an amplifying and integrating device 49 which produces an electrical output dependent upon the intensity of the radiation transmitted to detector 48 through the substance in the pipeline. Also connected to pipeline 41, preferably adjacent to emitter 42 and detector 48 is a device 51 for continuously measuring the density of the fluid in pipeline 41. Device 51 may be of any suitable known type of density meter which produces a continuous electrical or mechanical output which is dependent upon the density of the tested fluid. Device 51 preferably produces an electrical output signal having a magnitude dependent upon the density of the fluid. This output signal, together with the output from device 49, is supplied to a device 52 which correlates the two signals received, as will be described in further detail below.

If the same source, detector and sample thickness or path length are used in the embodiment of Fig. 3 as are used in the apparatus of Fig. 1, the same calibration curve 37 may be used for both embodiments. However, to obtain maximum accuracy, the elements of Fig. 3 are preferably calibrated when in position, by running hydrogen-containing fluids of known density and hydrogen content through the pipeline and calibrating the apparatus to obtain a characteristic curve in a manner similar to that described above for Fig. 1.

After calibrating the apparatus and obtaining the characteristic curve, which will also be substantially a straight line, the substance to be analyzed is put into the pipeline. Emitter 42 transmits a collimated beam of gamma rays through the tested substance to cause detector 48 to supply to device 49 a signal dependent upon the intensity of the beam transmitted through the tested substance. Device 49 preferably converts the signal from detector 48 into an electrical signal having a magnitude dependent upon the numerical value of the quantity $$\frac{d(1+H)}{2}$$

for the tested substance. Similarly, device 51 supplies to device 52 an electrical signal which is a continuous measure of the density of the tested substance. Device 52 therefore receives two signals dependent, respectively, upon the density and the numerical value of the quantity $$\frac{d(1+H)}{2}$$

By equating this quantity to the numerical value, the expression can then be solved for hydrogen content H, by transforming to $$H = \frac{2K}{d} - 1$$

where K is the numerical value of the quantity $$\frac{d(1+H)}{2}$$

It will be seen that solution of this equation involves only subtraction and division, so that, given the values, or electrical analogs thereof, of K and d, suitable well known electrical circuits can be easily utilized to continuously obtain the value, or electrical analog, of H. The value of H obtained by device 52 may be be used to provide an indication on a suitable meter and/or may be continuously recorded for future reference.

If it is desired to determine the density of a hydrogen-containing substance by the method of this invention, the apparatus shown in Fig. 3 can be modified by replacing device 51 with a suitable known device for providing a continuous indication of the hydrogen content of the tested substance and device 52 can be adjusted to solve for the value of d in the equation:

$$d = \frac{2K}{1+H}$$

where K again is the numerical value of the quantity $$\frac{d(1+H)}{2}$$

Additional examples of application of the method and apparatus of this invention will readily become apparent to those skilled in the art. In many phases of petroleum refinery operations, it is often desirable to continuously know the degree to which the operation has progressed. For example, in the conversion of methylcyclohexane to toluene, it is desirable to know the percentage mole conversions during the operation. Since the percentage conversion is a function of the hydrogen content, the value of the quantity $$\frac{d(1+H)}{2}$$

is a measure of the percentage conversion. Therefore, after suitable calibration, apparatus similar to that shown in Fig. 4 may be used to continuously provide an indication of the degree to which such a conversion has progressed.

In the case of gases, the method of this invention is extremely sensitive to the molecular weight of the gas, since the gas density at a given pressure is determined by its molecular weight. The method is therefore useful in following hydrogenation and dehydrogenation reaction, studying the composition of recycle gases in hydroforming or platforming, and in studying the gasoline content of natural gas and the efficiency of the scrubbing of this gas for its natural gasoline content.

Although the embodiments described thus far have been in connection with the analysis of hydrogen-containing fluids, the method and apparatus of the invention are equally applicable to the analysis of solids. For example, this invention would be useful for analyzing coal, oil shale or core samples for total hydrogen content.

I claim:

1. A method for determining the hydrogen content of a hydrogen-containing substance comprising the steps of transmitting a beam of gamma rays over a predetermined path through a first hydrogen-containing material having a known density and a known hydrogen content, measuring the intensity of said beam after being transmitted through said first material, transmitting said beam over said predetermined path through a second hydrogen-containing material having a known density and a known hydrogen content different from the hydrogen content of said first material, measuring the intensity of said beam after being transmitted through said second material, establishing a relationship between said measured intensities of said beam and the respective quantities $$\frac{d(1+H)}{2}$$

for said first and said second materials, where $d$ is the density and H is the percentage of hydrogen by weight, transmitting said beam over said predetermined path through said substance, measuring the intensity of said beam after being transmitted through said substance, and, from said established relationship, determining the hydrogen content of said substance.

2. A method for determining the hydrogen content of a hydrogen-containing substance comprising the steps of transmitting a beam of gamma rays over a predetermined path through a first hydrogen-containing material having a known density and a known hydrogen content, measuring the intensity of said beam after being transmitted through said first material, transmitting said beam over said predetermined path through a second hydrogen-containing material having a known density and a known hydrogen content different from the hydrogen content of said first material, measuring the intensity of said beam after being transmitted through said second material, establishing a relationship between said measured intensities of said beam and the respective quantities $$\frac{d(1+H)}{2}$$

for said first and said second materials, where $d$ is the density and H is the percentage of hydrogen by weight, transmitting said beam over said predetermined path through said substance, measuring the intensity of said beam after being transmitted through said substance, determining from the previously established relationship the quantity $$\frac{d(1+H)}{2}$$

for said substance, measuring the density of said substance, and determining the hydrogen content of said substance from the relationship $$\frac{d(1+H)}{2}$$

3. A method for determining the hydrogen content of a hydrogen-containing substance comprising the steps of transmitting a beam of gamma rays over a predetermined path through a first hydrogen-containing material having a known density and a known hydrogen content, measuring the intensity of said beam after being transmitted through said first material, transmitting said beam over said predetermined path through a second hydrogen-containing material having a known hydrogen content and a known density different from the density of said first material, measuring the intensity of said beam after being transmitted through said second material, establishing a relationship between said measured intensities of said beam and the respective quantities $$\frac{d(1+H)}{2}$$

for said first and said second materials, where $d$ is the density and H is the percentage of hydrogen by weight, transmitting said beam over said predetermined path through said substance, measuring the intensity of said beam after being transmitted through said substance, determining from the previously established relationship the quantity $$\frac{d(1+H)}{2}$$

for said substance, measuring the density of said substance, and determining the hydrogen content of said substance from the relationship $$\frac{d(1+H)}{2}$$

4. A method for determining the hydrogen content of a substance comprising the steps of transmitting a beam of gamma rays over a predetermined path through a first hydrogen-containing material having a known density and a known hydrogen content, said gamma rays emanating from a source having an energy level of at least one half million electron volts, measuring the intensity of said beam after being transmitted through said material, transmitting said beam over said predetermined path through a second hydrogen-containing material having a known density and a known hydrogen content different from the hydrogen content of said first material, measuring the intensity of said beam after being transmitted through said second material, establishing a relationship between said measured intensities and the respective quantities $$\frac{d(1+H)}{2}$$

for said first and said second materials, where $d$ is the density and $H$ is the percentage of hydrogen by weight, transmitting said beam over said predetermined path through said substance, measuring the intensity of said beam after being transmitted through said substance, correlating the measured intensity of said beam after being transmitted through said substance with said previously established relationship to determine the quantity $$\frac{d(1+H)}{2}$$

for said substance, and determining the hydrogen content of said substance from said last-named quantity.

5. Apparatus for determining a selected characteristic of a hydrogen-containing substance comprising a source of gamma rays mounted on one side of said substance to transmit a beam of gamma rays over a predetermined path in said substance, a radiation detector mounted on the other side of said substance for producing a first output signal dependent upon the intensity of said beam after being transmitted through said substance, an integrating device connected to said detector for converting said output signal into a second output signal dependent upon the numerical value of the quantity $$\frac{d(1+H)}{2}$$

for said substances, where $d$ is the density of the substance and $H$ is the hydrogen content of said substance expressed as a percentage of unity, a density meter positioned in contact with said substance to produce a third output signal dependent upon the density of said substance, and correlating means connected to said density meter and said integrator for correlating said second and said third output signals to provide an indication of the hydrogen content of said substance.

6. A method for determining the hydrogen content of a substance of known density, comprising the steps of (a) transmitting a beam of gamma radiation over a predetermined path through a first material having a known density and hydrogen content, (b) measuring the intensity of said beam after it has passed through said material, repeating steps (a) and (b) for a second material of known density and known hydrogen content that is different from said first material to determine a function representing the relation between transmitted beam energy and hydrogen content, repeating said steps (a) and (b) for said substance to be tested, and comparing said last-named transmitted beam intensity with said function to determine the hydrogen content of said substance.

References Cited in the file of this patent

UNITED STATES PATENTS

| 2,621,297 | Obermaier | Dec. 9, 1952 |
| 2,641,710 | Pompeo et al. | June 9, 1953 |

U. S. DEPARTMENT OF COMMERCE
PATENT OFFICE

CERTIFICATE OF CORRECTION

Patent No. 2,833,929     Robert E. Barieau            May 6, 1958

It is hereby certified that error appears in the printed specification of the above numbered patent requiring correction and that the said Letters Patent should read as corrected below.

Column 3, line 65, for the term "$mg/cf^2$" read -- $mg/cm^2$ --; column 7, line 24, strike out "be", second occurrence.

Signed and sealed this 29th day of July 1958.

(SEAL)
Attest:
KARL H. AXLINE
Attesting Officer

ROBERT C. WATSON
Commissioner of Patents